US007000079B2

(12) United States Patent
Detjens et al.

(10) Patent No.: US 7,000,079 B2
(45) Date of Patent: Feb. 14, 2006

(54) METHOD AND APPARATUS FOR VERIFICATION OF COHERENCE FOR SHARED CACHE COMPONENTS IN A SYSTEM VERIFICATION ENVIRONMENT

(75) Inventors: Claude Karl Detjens, Pflugerville, TX (US); Steven Robert Farago, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 469 days.

(21) Appl. No.: 10/418,500

(22) Filed: Apr. 17, 2003

(65) Prior Publication Data

US 2004/0210721 A1    Oct. 21, 2004

(51) Int. Cl.
*G06F 12/14* (2006.01)
(52) U.S. Cl. ..................................... 711/141
(58) Field of Classification Search ............... 711/141, 711/145; 703/21
See application file for complete search history.

(56) References Cited

U.S. PATENT DOCUMENTS 6,021,261 A    2/2000  Barrett, Jr. et al. ..... 395/183.13
6,173,243 B1 *  1/2001  Lowe et al. .................. 703/14
6,892,173 B1 *  5/2005  Gaither et al. ................ 703/20
2005/0144400 A1 *  6/2005  Hum et al. .................. 711/145

\* cited by examiner

*Primary Examiner*—Kevin L. Ellis

(74) *Attorney, Agent, or Firm*—Duke W. Yee; Casimer K. Salys; Stephen J. Walder, Jr.

(57) ABSTRACT

A method and apparatus for verification of coherence for shared cache components in a system verification environment are provided. With the method and apparatus, stores to the cache are applied to a cache functional simulator in the order that they occur in the trace information from the canonical tracers. However, rather than updating the cache simulator with the actual data stored, the performed time of the store event is applied to the simulator as data. The cache simulator stores the latest performed time for each byte of each cache line in the simulated cache, in an associated data structure. For each load event that is encountered in the trace information for a byte, a comparison is made between a global expected data age of the data in the cache and the performed time associated with the byte. If the data age in the simulated cache for the byte is less than the global expected data age, i.e. a latest previously encountered data age, then a cache coherence violation has occurred.

20 Claims, 7 Drawing Sheets

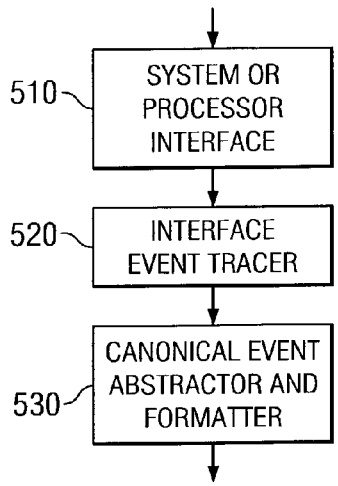
*FIG. 5*
| TAG 610 | TYPE 620 | SIZE 630 | ADDRESS 640 | DATA 650 |
|---|---|---|---|---|
| REQUEST STATUS 660 | COHERENCE STATUS 670 | ISSUE TIME 680 | STORAGE ACCESS TIME 682 | |
| STORAGE ACCESS LEVEL 686 | TARGET ADDRESS 688 | COMPLETION TIME 690 | PERFORMED TIME 695 | |
*FIG. 6*
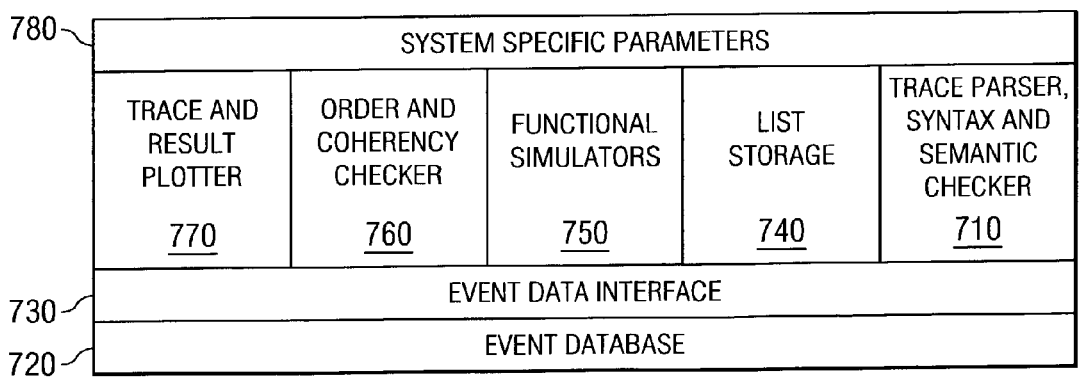
*FIG. 7*

```
Main algorithm
For each chip, byte (loop 1)
   Initialize StoreList iterator (ST_IPT_Itr)
   Initialize StoreListPT Iterator (ST_PT_Itr)

For each processor on current Chip (loop 2)
       DataAge=0;
       Initialize LoadList Iterator (LD_Itr)
       while LD_Itr is valid
               currentLoad=current instruction referenced by LD_Itr;
               Advance LD_Itr updateCacheSimulations(ST_IPT_Itr, ST_PT_Itr, (IT of currentLoad), currentCache);

set all values in currentCache equal to values in prevCache

//*Save current iterator positions
               temp_ST_IPT_Itr=temp_ST_IPT_Itr; ST_PT_Itr=temp_ST_IPT_Itr;

LoadLevel = (IPSRC of currentLoad);
               LoadProcessor = (Processor of currentLoad);
               ExpectedAge = currentCache[LoadLevel][LoadProcessor]

if (ExpectedAge < DataAge) FAIL...COHERENCE VIOLATION
               if (ExpectedAge > DataAge) DataAge=ExpectedAge end loop 2
    end loop 1
end main algorithm //Assume all time fields for NULL events are equal to MAXINT
function updateCacheSimulations(ST_IPT_Itr, ST_PT_Itr, StopTime, cacheArray)
    while (ST_IPT_Itr valid) OR (ST_PT_Itr valid)
       current_IPT_Store = current instruction referenced by ST_IPT_Itr OR NULL if (ST_IPT_Itr is not valid)
       current_PT_Store = current instruction referenced by ST_PT_Itr or NULL if (ST_PT_Itr is not valid)
       if (IPT of current_IPT_Store) > StopTime && (PT of current_PT_Store > StopTime) return;
       currentProcessor = (Processor issuing current_IPT_Store)
       if (IPT of current_IPT_Store)<(PT of current_PT_Store)

currentLevel = (IPSRC of current_IPT_Store)
               if (current_IPT_Store is a cache reload event)
                 cacheArray[currentLevel][currentProcessor]=cacheArray[currentLevel+1][currentProcessor]
               else
                 cacheArray[currentLevel][currentProcessor]=(PT of current_IPT_Store)
               endif
                 advance ST_IPT_Itr
        else
               currentLevel = (Level 2) //i.e. lowest shared level of cache in system
               cacheArray[currentLevel][currentProcessor] = (PT of current_PT_Store)
               advance ST_PT_Itr
        endif
     end while
end function
```

*FIG. 12*

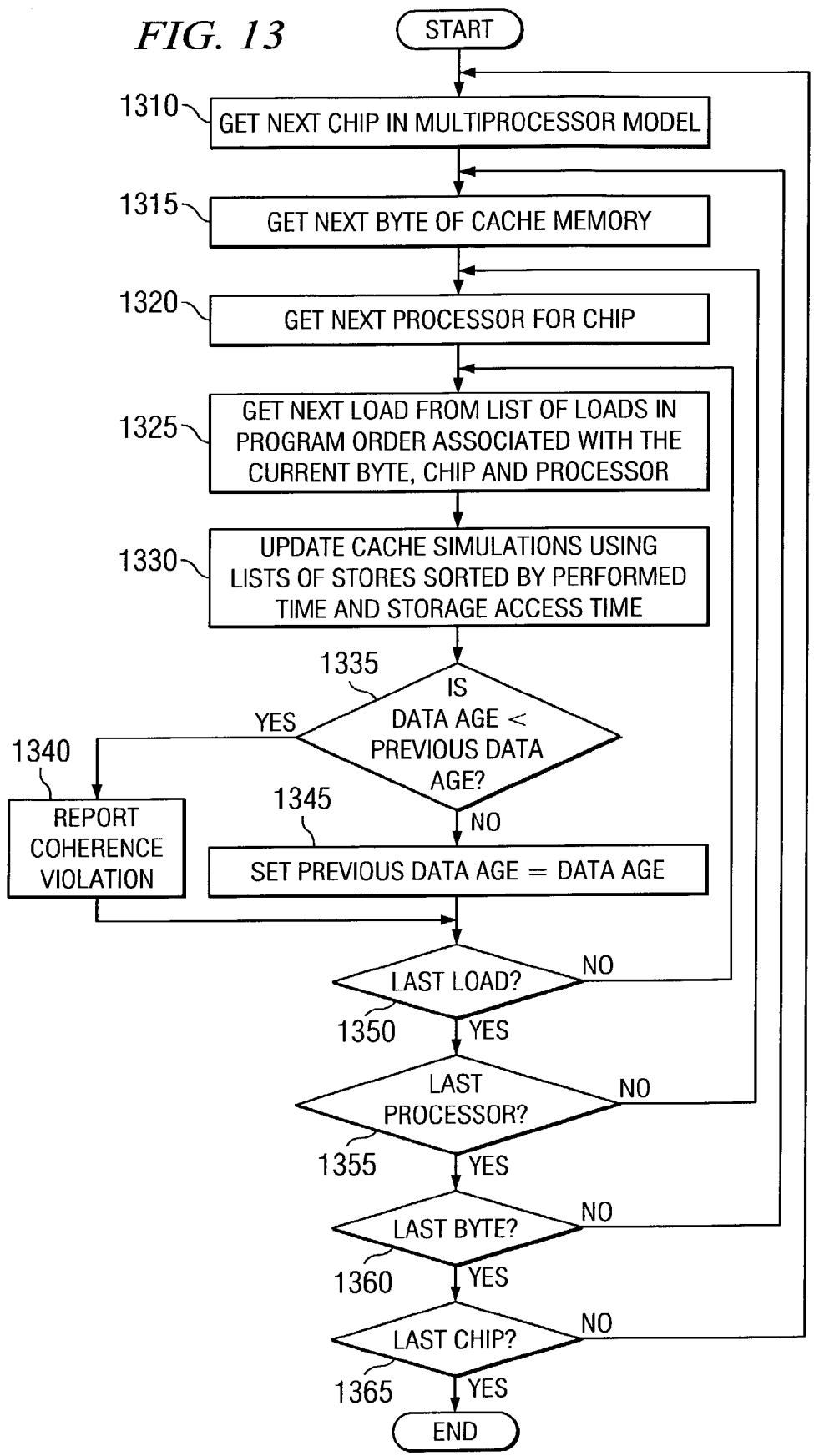

METHOD AND APPARATUS FOR VERIFICATION OF COHERENCE FOR SHARED CACHE COMPONENTS IN A SYSTEM VERIFICATION ENVIRONMENT

BACKGROUND OF THE INVENTION

1. Technical Field

The present invention is directed to a method and apparatus for verification of coherence for shared cache components in a system verification environment.

2. Description of Related Art

Every computer architecture defines consistency and coherence rules for storage accesses to memory locations. Consistency refers to the ordering of all storage access events within a processor. Coherence refers to the ordering of competing storage access events from different processors. The most restrictive form of consistency and coherence rules is sequential consistency rules. Sequential consistency rules limit the performance of programs by requiring all storage accesses to be strictly ordered based on the order of instructions in the processor and across all processors. Several new techniques have relaxed this requirement, under certain conditions, and allow storage accesses within a processor and across different processors to be performed out-of-order. Any required consistency is enforced by the use of synchronization primitives which are an integral part of these architectures.

For example, the PowerPC™ architecture permits the hardware to be aggressive by using a weak consistency scheme which, under certain conditions, allows storage accesses to be performed out-of-order. The following are examples of weak consistency rules used with the PowerPC™ architecture:

Rule 1: Dependent loads and stores from the same processor must perform in order and all non-dependent accesses may perform out-of-order, unless a synchronization operation, such as an Acquire or Release operation, is present to explicitly order these loads and stores. By dependent, what is meant is that these loads and stores are to overlapping addresses or there is some explicit register-dependency among them.

Rule 2: Competing loads and stores from different processors can perform in any order. As a result, these loads and stores must be made non-competing by enclosing them within critical sections using lock and unlock routines. By competing, what is meant is that these loads and stores are to overlapping bytes and at least one of them is a store.

The PowerPC™ architecture defines memory coherence rules as follows:

Rule 3: All accesses to a particular location are coherent if all stores to the same location are serialized in some order and no processor can observe any subset of those stores in a conflicting order.

Rule 4: All values loaded by a processor accessing a location in a specified interval should be a subsequence or the sequence of values held by the location in that interval. That is, a processor can never load a "new" value first and later load an "older" value.

The coherence rules described above are better explained with reference to the following example. Consider storage accesses to location A in a two-way PowerPC™ symmetric multiprocessor (SMP) system:

| Processor 0 | Processor 1 |
|---|---|
| LD, R1, A | ST, 1, A |
| LD, R2, A | ST, 2, A |
| ST, 3, A | ST, 4, A |
| LD, R3, A | |

Under the coherence rules stated above, the load into R1 on processor 0 can contain the values 1, 2 or 4 but not 3. If processor 0 loads the value 2 into R1, then it can load 2 or 4, but not load 1 or 3, into R2. In addition, if processor 0 loads 2 into R2, it can load 3 or 4, but not 1 or 2, into R3.

In order to preserve the memory coherence requirement described above, most PowerPC™ multiprocessor implementations use the write-invalidate protocol. This protocol allows multiple readers and at most one writer for each memory location. Stores are ordered sequentially by each processor requesting write access on the system bus. When a processor obtains write access, it broadcasts an invalidation message to all other processors on the system bus. Each processor that receives this message invalidates its copy of the data. A processor that has been granted write access proceeds to write to its cache copy. When necessary, the processor uses synchronization operations to ensure that this copy is visible to all other processors.

Most system designs are represented by a model written in a hardware description language (HDL) that can later be transformed into an integrated circuit chip. The model is extensively verified through simulation before it is sent for fabrication, which is referred to as a tape-out. Since the fabrication process is highly expensive, it is necessary to keep the number of tape-outs to a small number. In order to minimize the number of tape-outs, a good simulation plan containing a wide range of tests that cover various aspects of the system is necessary. In addition, robust verification tools, such as fast simulators, deterministic and random test generators, and a checker that checks both consistency and coherence violations in the design, are necessary.

Verification of storage access rules grows in complexity, especially in a weakly ordered system where some sequences of a program may perform out-of-order and some must perform in order. Further, the complexity significantly increases when verifying these ordering rules in a multiprocessor system. Described hereafter are two commonly used checking schemes which represent two extremes of the spectrum of known checkers. The first is a static checker and the second is a classic checker.

The static checker, depicted in FIG. 1, is very easily portable between systems with little or no changes. As shown in FIG. 1, the static checker 120 consists of a simple functional simulator 130 and a comparator 140. A test case (test) is input and the static checker 120 computes expected values of all locations in the system. The test case is also input to the model under test 110 and actual values for all register, cache and memory locations in the system are obtained from the simulated model. The actual values are then compared to the expected values using the comparator 140. If a mismatch occurs, it may be due to a coherence violation. Since the functional simulator 130 is only a simple reference model of the system, the functional simulator 130 can only compute deterministic values. As a result, test cases that may cause race conditions due to competing accesses are not permitted. The static checker 120 requires that multiprocessor test cases perform storage accesses only to non-overlapping bytes such that the expected results are deterministic.

There are several limitations to the use of a static checker. First, multiprocessor test cases are restricted to performing stores only to non-overlapping bytes, as stated previously. Second, checks are limited to data values available at the end of the test case run. Third, there is no provision to verify storage access ordering of events. In the static checker 120, synchronization accesses, such as Acquire and Release, can be competing and requires special test cases to be developed to ensure their correct operation. With such limitations, it is possible for the model under test 110 to correctly complete the test case but still contain ordering and coherency violations that escape detection. In order to detect these violations, several billion cycles and sequences may need to be run such that these violations propagate to the end of the test case.

FIG. 2 illustrates the other end of the spectrum of checkers, i.e. the classic checker. The classic checker is written with an intimate knowledge of the system being verified with this knowledge being sued to shadow various interfaces and states of the system. As a result, the classic checker is not as portable as the static checker and many modifications may be necessary in order to use the classic checker with a new system.

The classic checker is designed to be functionally equivalent to the actual system and thus, provide comprehensive coverage of the system under test. As shown in FIG. 2, the model under test 260 includes a plurality of state machines 270–290. The classic checker 210 is designed to be functionally equivalent to the model under test by including a plurality of shadow state machines 220–240 and a comparator 250. The equivalency between the classic checker 210 and the model under test 260 is accomplished by matching the state of the classic checker 210 with the model under test 260 at all times. The comparator 250 compares the states of the state machines 270–290 and shadow state machines 220–240 to determine if there is any mismatch. If there is a mismatch, then the mismatch may be due to a coherency violation.

The classic checker 210 may execute in real time or run as a post-processor. In either scenario, the classic checker requires detailed access to the internal functions of the model under test 260 to extract state information and compare it with its own shadow state information. Some of the features of the classic checker include that it permits unrestricted storage accesses to dependent and competing locations, it verifies ordering and coherency for all operations in the system, it verifies the state of the caches and memory at all times, and it verifies that all requests and responses from various system components are correct.

Despite its capabilities, however, the classic checker fails to consistently deliver its objectives due to constant design changes and instances (transient states) when the checker is unable to exactly determine the state of the actual design. As a result, the classic checker has a much higher cost and is not portable to other systems.

Current markets demand faster development cycles. Neither static checkers nor classic checkers provide the time and accuracy requirements for achieving these faster development cycles without increasing the cost of verification. Static checkers often miss ordering and coherency violations and thus, are not as accurate as classic checkers. Classic checkers, however, require extensive development times and are not portable to new circuit designs or changes in the design for which the classic checker was developed. As a result, some ordering and coherency violations often escape detection by checkers and are only identified after fabrication of the integrated circuit chip. This leads to more tape-outs and increased cost.

Thus, there is a need for an improved coherency checker such that portability of the checker is preserved without loss in the coherency checking ability of the checker.

SUMMARY OF THE INVENTION

The present invention provides a method and apparatus for verification of coherence for shared cache components in a system verification environment. The method and apparatus of the present invention performs coherency checks to verify that stores to a given data location are serialized in some order and no processor of the multiprocessor system is able to observe any subset of those stores as occurring in a conflicting order.

The coherency checks, according to a preferred embodiment, make use of the cache functional simulator to simulate various levels of cache in the multiprocessor model. Stores to the cache, i.e. store events, are applied to the cache functional simulator in the order that they occur in the trace information from the canonical tracers. However, rather than updating the cache simulator with the actual data stored, the performed time of the store event is applied to the simulator as data.

The cache simulator stores the latest performed time for each byte of each cache line in the simulated cache, in an associated data structure. In this way, the age of the data associated with any byte in the cache at any one time during the trace may be determined from the performed times stored for each byte of the simulated cache. Alternatively, the trace information may be applied to the cache simulator on a byte by byte basis so that the coherency checking is performed for combination of cache byte and processor of a given chip in the model under test.

The magnitude of the performed time may be used as an indication of the global age, or the global serialization order, of the data stored. A comparison of the performed times of store events may be used to verify coherence across all of the processors of the multiprocessor system, as discussed hereafter.

In addition to store events, the trace information includes load events. For each load event that is encountered during traversing of the trace information, a comparison is made between a global expected data age of the data in the cache and the performed time of the data in the cache at the cache location referenced by the load event. The expected data age is the latest data age seen by any previous load event in the trace information. That is, the expected data age is the latest performed time identified in a previous check of a load event.

The comparison of the global expected data age of the data and the performed time associated with the data location referenced by the load instruction involves checking that the performed time is greater than or equal to the global expected data age. Stated differently, the check is to ensure that the performed time, or data age in the simulated cache, is not less than the global expected data age, i.e. the latest previously encountered data age. If the data age in the simulated cache is less than the latest previously encountered data age, then a cache coherence violation has occurred.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is an exemplary block diagram of a canonical tracer in accordance with the present invention;

FIG. 6 provides an example of an abstracted trace entry in accordance with a preferred embodiment of the present invention;

FIG. 7 is an exemplary diagram illustrating a CCC module in accordance with the present invention;

FIG. 12 is an example of code that may be used to accomplish the coherence verification according to one embodiment of the present invention; and FIG. 13 is a flowchart outlining an exemplary operation of the present invention for determining if a coherence violation has occurred.

DETAILED DESCRIPTION OF THE PREFERRED EMBODIMENTS

The present invention provides a mechanism for verification of coherence for shared cache components in a system verification environment. The present invention is especially suited for use with multiprocessor systems in which two or more processors share the same memory. Therefore, FIG. 3 is provided as an exemplary diagram of a multiprocessor system with which the present invention may be used.

Figure 1:
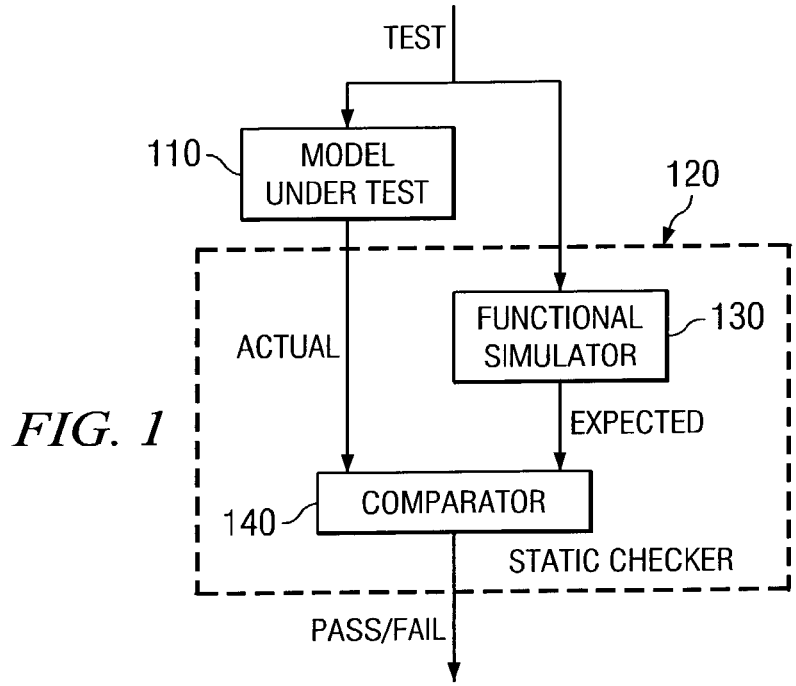
FIG. 1 is an exemplary diagram of a static checker.
Figure 2:
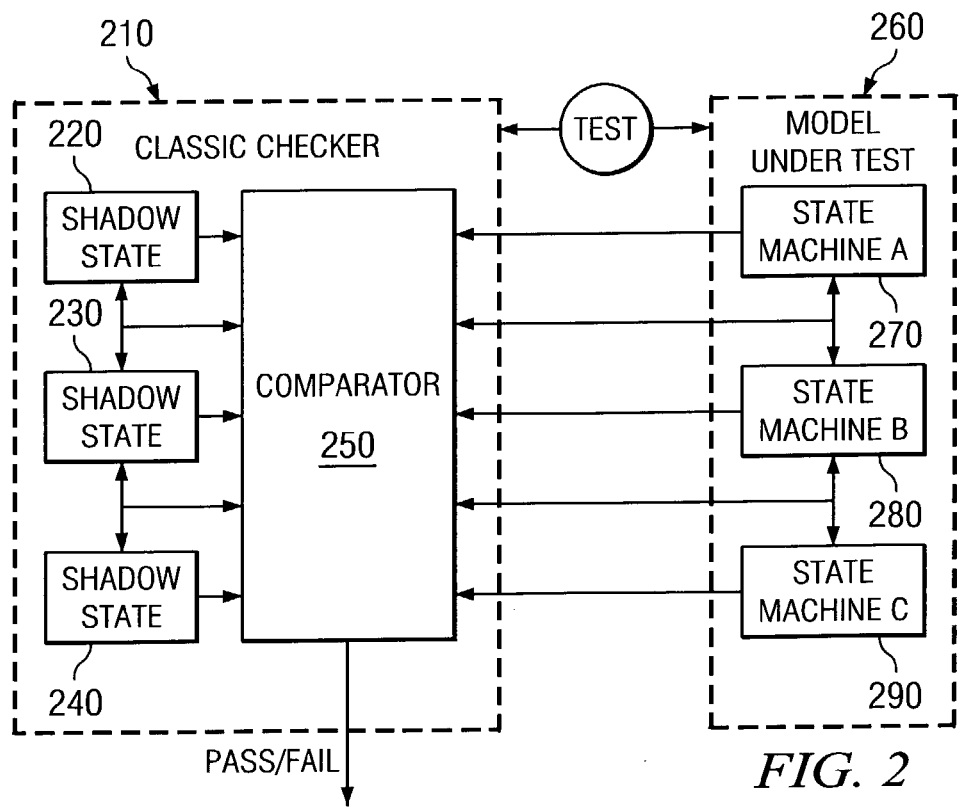
FIG. 2 is an exemplary diagram of a classic checker.
Figure 3:
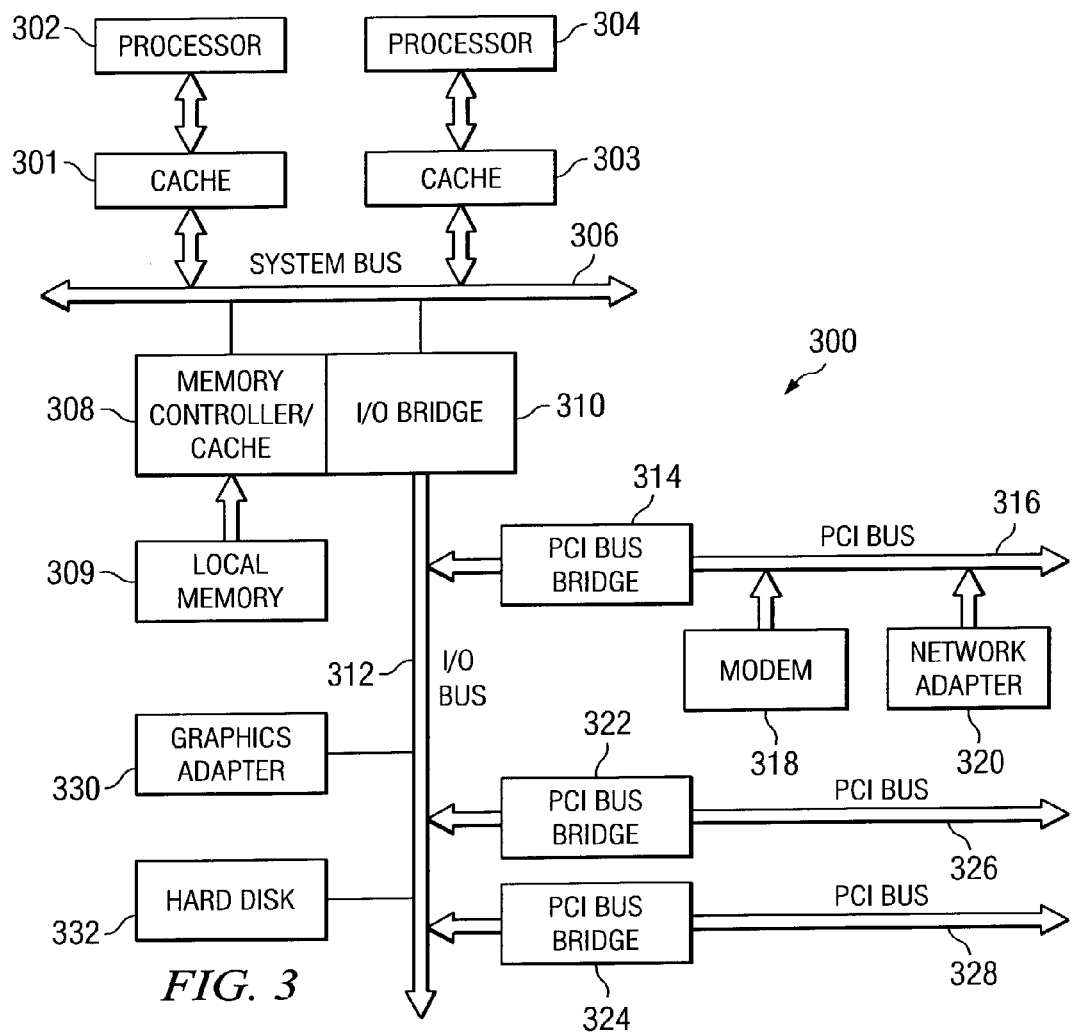
FIG. 3 is an exemplary block diagram of a multiprocessor data processing system in accordance with the present invention.

FIG. 3 is an exemplary block diagram of a multiprocessor data processing system in accordance with the present invention. As shown in FIG. 3, data processing system 300 is a symmetric multiprocessor (SMP) system including a plurality of processors 302 and 304 connected to system bus 306 and having associated caches 301 and 303. Also connected to system bus 306 is memory controller/cache 308, which provides an interface to local memory 309. I/O bus bridge 310 is connected to system bus 306 and provides an interface to I/O bus 312. Memory controller/cache 308 and I/O bus bridge 310 may be integrated as depicted.

Peripheral component interconnect (PCI) bus bridge 314 connected to I/O bus 312 provides an interface to PCI local bus 316. A number of modems may be connected to PCI bus 316. Typical PCI bus implementations will support four PCI expansion slots or add-in connectors. Communications links to network computers may be provided through modem 318 and network adapter 320 connected to PCI local bus 316 through add-in boards.

Additional PCI bus bridges 322 and 324 provide interfaces for additional PCI buses 326 and 328, from which additional modems or network adapters may be supported. In this manner, data processing system 300 allows connections to multiple network computers. A memory-mapped graphics adapter 330 and hard disk 332 may also be connected to I/O bus 312 as depicted, either directly or indirectly.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 3 may be, for example, an IBM RISC/System 6000 system, a product of International Business Machines Corporation in Armonk, N.Y., running the Advanced Interactive Executive (AIX) operating system.

In view of the multiprocessor system illustrated in FIG. 3, it has been determined that it is possible to reconstruct the storage access order in a test case from a trace of activities at the processors 302 and 304 and the system bus 306. This reconstruction is possible because the system bus interface is a serialization point for all cache-coherent operations, i.e. is a point of coherence, across all processors and the processor interface is the point of consistency for all operations within a processor.

Coherence refers to the ordering of competing storage access events from different processors. Hence, a point where multiprocessors broadcast information, such as at the system bus, may be defined as a point-of-coherence. Consistency refers to the ordering of all storage access events within a processor. Hence, a trace point in the processor, such as an Instruction Dispatch and Completion Unit, where instructions are issued and performed, may be defined as the point-of-consistency.

Traces from the point-of-consistency and the point-of-coherence, hereafter collectively referred to as points-of-ordering, may be used by the present invention to infer write-ownership on the system bus and consistency within the processor. Both traces provide sufficient information for the present invention to perform detailed checking of various operations.

With the present invention, tracers are instrumented for the points-of-ordering and checkers are used to check the trace information obtained from these tracers for consistency and/or coherence violations. The checkers then output results of these checks indicating whether the multiprocessor model passes or fails such checks.

As stated above, the system bus in the multiprocessor system is a point in the system where all reads and writes are ordered with respect to all processors. From these points-of-ordering associated with the system bus, it can be determined if the reads and writes are coherent with respect to the coherence protocol used in the system, e.g., write-invalidate protocol. In most multiprocessor designs, the system bus interface specification is well architected and is reused in several systems. The cost of defining a new system bus for each multiprocessor system is prohibitive and also prevents the reuse of existing ASICs such as cache and memory controllers. As a result, tracers for system buses are portable across several multiprocessor systems.

The processor interface is the point-of-consistency in the system, i.e. the trace point where all of the storage access events are to be in an order. By tracing this interface, it is possible to determine the order in which instructions are issued, completed and performed.

The term "issued" refers to, for example, an instruction being dispatched by an instruction dispatch unit (IDU) to the memory interface unit (MIU). The present invention only assumes that instructions are issued in program order. In FIG. 3, all data for instructions, include issue time, would be gathered by the processor tracers (302, 304).

The term "completed" refers to an instruction being executed in the execute pipeline and it is at a stage in the MIU where any exception will not cause the re-issuance of this instruction. In a system where precise interrupts are required, such as the PowerPC™ architecture, when an exception occurs, the system maintains correct architectural state by performing all competed instructions and reissuing instructions that have been issued but not completed.

The term "performed" refers to when the value to be returned by a load instruction can no longer be changed by a subsequent store to the same location by any processor. A store instruction is performed with respect to all processors when any load from the same location written by the store returns the value stored.

The processor interface varies from one processor to another. As a result, the tracers of the present invention must change whenever there is a processor change. However, the cost of designing a new processor for every system is quite prohibitive and not likely. As a result, processors tend to be reused in many systems and thus, their respective tracers are portable as well. Therefore, by devising tracers for the processor interfaces and system bus interfaces, the present invention is made portable such that it may be used with a plurality of different multiprocessor system models.

The processor and system bus tracers generate trace data during cycle simulation of the multiprocessor model based on a test case. This trace data, which is specific to the processor and system bus implementation in the multiprocessor model, is used to generate abstracted trace data for use with a consistency and coherency checking module. The events in the abstracted trace are time-ordered by issuance time and then a plurality of coherence and consistency checks are applied to the time-ordered list of events. Based on the outcome of these checks, a determination is made as to failures of the multiprocessor model with regard to consistency and coherence requirements.

The present invention may most easily be embodied as a post-processor although the present invention may also be used as a dynamic verification module that operates on simulator information dynamically to determine whether the multiprocessor model meets requirements under various test conditions. Therefore, for simplicity of the present description, it will be assumed, without implying any limitation of the present invention, that the present invention is embodied in a post-processor.

Figure 4:
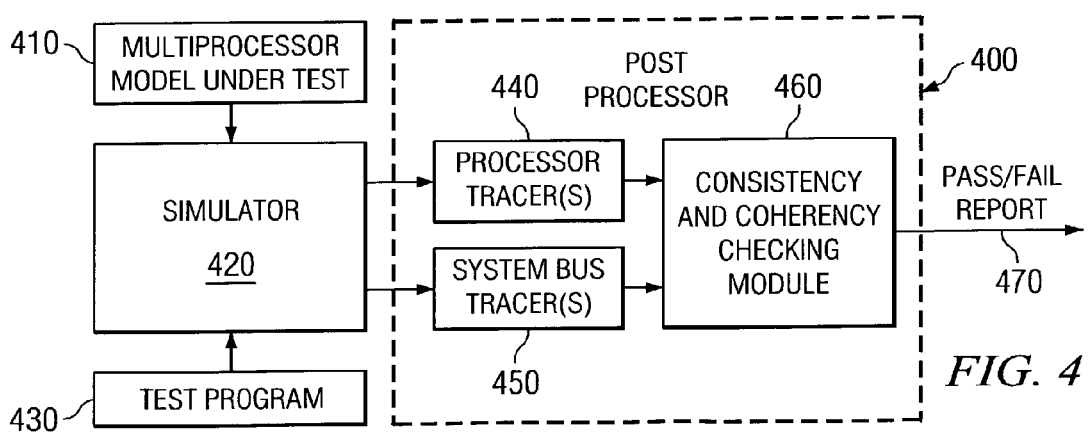
FIG. 4 is an exemplary block diagram of a post processor in accordance with the present invention.

FIG. 4 is an exemplary block diagram of a post processor 400 in accordance with the present invention. As shown in FIG. 4, a multiprocessor system model 410 is provided to a simulator 420 along with a test program 430. The simulator outputs simulator data to the post processor 400.

The post processor 400 includes one or more processor tracers 440, one or more system bus tracers 450, and a consistency and coherency checking (CCC) module 460. Simulator data is provided to the processor tracers 440 and the system bus tracers 450 which generate trace information that is provided to the CCC module 460. The CCC module 460 performs a plurality of consistency and coherency checks of the trace data from the processor tracers 440 and system bus tracers 450 and generates an output indicating whether or not the multiprocessor model operated within consistency and coherency requirements or if a consistency or coherency violation occurred. This information may then be used to determine how the multiprocessor model should be modified so as to assure operation within the consistency and coherency requirements.

FIG. 5 is an exemplary block diagram of a canonical tracer in accordance with the present invention. The canonical tracer shown in FIG. 5 may be used as a system bus interface tracer, a processor tracer, or both. In a preferred embodiment, the canonical tracer illustrated in FIG. 5 is used for both tracing of simulation data for processors and system bus interfaces.

As shown in FIG. 5, the canonical tracer 500 includes an interface event tracer 520 and a canonical event abstractor and formatter 530. The interface event tracer 520 is custom designed for the specific interface 510 for which it is used. Every interface, such as interface 510, defines a low level protocol that is used by all the devices connected to the interface. This protocol consists of a set of requests and responses. Requests and response may originate from one or more devices connected to the interface. The interface event tracer 520 traces requests and responses sent and received by the interface 510.

A request originating from a device includes a "type" that identifies the nature of the request and a "tag" which identifies both the source (device ID) of the request and a sequence number (sequence ID) to identify a particular request from that device. A response to a request may contain one or more partial responses each containing the tag of the request that caused the response. A partial response may be, for example, an acknowledgment of a request and another may be a data transfer associated with the request.

The exact details of how a tracer obtains the trace are highly dependent on the specific interface being traced. In general, a tracer implements, in software, enough of the protocol governing communication on the interface (or perhaps multiple interfaces) to enable it to gather the information required by the checkers into a single data structure. The present invention assumes a verification environment in which trace information is obtained. The present invention improves upon such an environment by incorporating a novel type of coherence checker. An example of such a verification environment is provided in Barrett et al., U.S. Pat. No. 6,021,261 entitled "Method and System for Testing a Multiprocessor Data Processing System Utilizing a Plurality of Event Tracers", issued on Feb. 1, 2000, which is hereby incorporated by reference. This document describes an exemplary embodiment of tracers and the details of tracer implementation which may be utilized with the present invention.

The trace information obtained using the interface event tracer is provided to the canonical event abstractor and formatter 530. The canonical event abstractor and formatter 530 contains a common and highly portable formulator that maps all canonical events into a trace format known to the consistency and coherency checking module. The canonical event abstractor and formatter 530 provides a uniform trace format across all systems.

FIG. 6 provides an example of an abstracted trace entry in accordance with a preferred embodiment of the present invention. As shown in FIG. 6, the abstracted trace information obtained by operation of the canonical event abstractor and formatter 530 on the trace information obtained from the interface event tracer 520 includes a tag field 610, a type field 620, a size field 630, an address field 640, a data field 650, a request status field 660, a coherence status field 670, an issue time field 680, a storage access time field 682, a storage access level field 686, a target address field 688, a completion time field 690, and a performed time field 695.

The tag field 610 contains a tag which, as discussed above, identifies the source and sequence number of a request. The tag is also used to associate responses with requests. Almost all interfaces have a tag unless requests and responses are sequentially ordered.

The type field 620 contains a type that is the operation type of the request. The type can be a load or store on the processor interface, or a read or write on the system bus interface. The consistency and coherency checking module of the present invention, as discussed hereafter, maintains an abstracted list of operation types defined for every architecture with which the consistency and coherency checking module may be used.

The size field 630 contains a size of the data associated with a load/store or a read/write operation. Defining a size field eliminates the need to maintain a list of opcodes for all the load/store and read/write operations.

The address field 640 includes an address of the load/store or read/write operation. Some operations may not require an address. For such cases, this field is not traced.

The data field 650 contains the data returned on a load/read operation or sent on a store/write operation. Some operations may not require data. For such cases, this field is not traced.

The request status field 660 contains the status of a request. This status indicates whether the operation was rejected or acknowledged by a device which processed the request.

The coherence status field 670 is primarily defined for the system bus interface. All cache-coherent multiprocessor buses define coherence status signals. The signals relate to the cache-coherence protocol, such as the MESI protocol, defined for the system bus. When a request is made by a processor on the system bus, one of the responses is the coherence status which indicates whether another processor has that address in its cache. The response in the coherence status field will allow a processor making the request to correctly set the state of its cache for that address.

The issue time field 680 contains the time when the request was first initiated on the interface. The storage access time field 682, for load events, contains the time at which data is accessed from some level of shared cache. For store events, this field 682 contains the time at which the store event updates some level of shared cache. The storage access level field 686 contains the level of storage, e.g., level 1 cache, level 2 cache, etc., associated with the storage access time in the storage access time field 682 for an event. The target address field 688 contains the byte targeted by the load or store event.

The completion time field 690 contains the time when the request is accepted by a device intending to respond to the request. A request that has been accepted is beyond the point of cancellation. The performed time field 695 contains the time when the request is performed with respect to all processors. An instruction has performed with respect to all processors when it is possible for any of the other processors to observe the results of the instruction. For example, given a multiprocessor system where all processors exchange information on a single shared bus, a STORE instruction can be said to have performed when its results would be observable by any READ request on that bus.

The abstracted trace information, such as that illustrated in FIG. 6, is provided to the consistency and coherency checking (CCC) module of the post-processor which performs checks of the abstracted trace information. The CCC module includes a plurality of checking mechanisms.

FIG. 7 is an exemplary diagram illustrating a CCC module in accordance with the present invention. As shown in FIG. 7, the CCC module includes a trace parser, syntax and semantic checker 710, an event database 720, an event data interface 730, list storage 740, functional simulators 750, order and consistency checker 760, trace and result plotter 770, and system specific parameters storage 780.

The input data for the CCC module is the abstracted processor and system bus trace information obtained during cycle simulation. This trace information is stored in the event database 720. The event database 720 stores a time-ordered list of the processor and system bus events that occurred during the course of the test run of the multiprocessor model via the simulator. The events are ordered based on their issuance time to preserve the program order sequence. Each event contains all the information that was traced by the canonical tracer as discussed above, e.g., the trace information illustrated in FIG. 6.

The trace parser, syntax and semantic checker 710 parses the event information received from the canonical tracers and performs syntax and semantic checking on the parsed event information. All tracers output information in a common, abstracted format to trace files. The parser/checker 710 reads these trace files, and ensures the files contain correctly formatted information. The parser/checker 710 is a part of the verification environment assumed by the present invention and described, for example, in the incorporated document U.S. Pat. No. 6,021,261.

The events data interface 730 is used as an interface to the event database 710. The events data interface 730 is a library of routines written to create, modify and delete event entries in the event database based on the event information received from the canonical tracers and checked by the trace parser, syntax and semantic checker 710. The events data interface 730 further provides the elements 750–770 with access to the event entries in the event database 720.

The event data interface 730 may further include libraries of functions developed on top of the interface in order to provide lists of events that represent various orderings and contexts of these events. One such ordering that is provided by the present invention is the block storage access (BSA) ordering. With BSA, an event list of all operations to a particular cache block is created. That is, a BSA list, which is generated by the event data interface 730 and stored in the BSA list storage 740, contains a list of processor and system bus storage access from all processors to a particular cache block. The BSA list is ordered based on the performed time, i.e. the time the request is performed with respect to all processors. A separate BSA list may be store din the BSA list storage 740 for each cache block reference in the trace information received from the canonical tracers.

The functional simulators 750 may include, for example, a memory functional simulator and a cache functional simulator. The memory functional simulator may simulate reads and writes into memory on the system bus. This simulator can provide the data in memory before and after the system bus operation. The cache functional simulator simulates the behavior of a single cache in each processor. Since the point-of-coherence is the system bus, irrespective of the number of caches within a processor, the granularity of the cache level nearest to the system bus is used by the functional simulator. The cache functional simulator is a functional simulator which loads and stores data from the processor and applies cache reloads when necessary. These functional simulators 750 are used to compare expected data values, obtained from the simulators 750, to data values in read/write and load/store operations.

The order and consistency checker 760 applies various checking algorithms on the event entries in the event database 720 to verify consistency and cache coherence. The checking functions used are independent of each other which allows new checking functions to be developed around existing functions. Each event in the event database 720 and the BSA list storage 740 contains a fail flag which can be set when a checking function detects that the event violates consistency and/or coherence rules. All failures eventually get propagated to a result file where more information on the failure is written. For example, the information on the failure may include a short error message along with an identification of the event involved and additional information may involve identification of other events related to the failure. The order and consistency checker 760 will be described in greater detail hereafter.

The trace and result plotter 770 is used to plot a time-ordered (based on issue time) list of all events in the event database 720. A user interface is provided to traverse the plot and identify failures. Since the plot is time-ordered, the plot provides a snapshot of processor or system bus events within a window of time. The user interface also provides the ability to view all events to a particular block address. Each event in the list can be selected and a pop-up window containing all information associated with the event is displayed.

Figure 8:
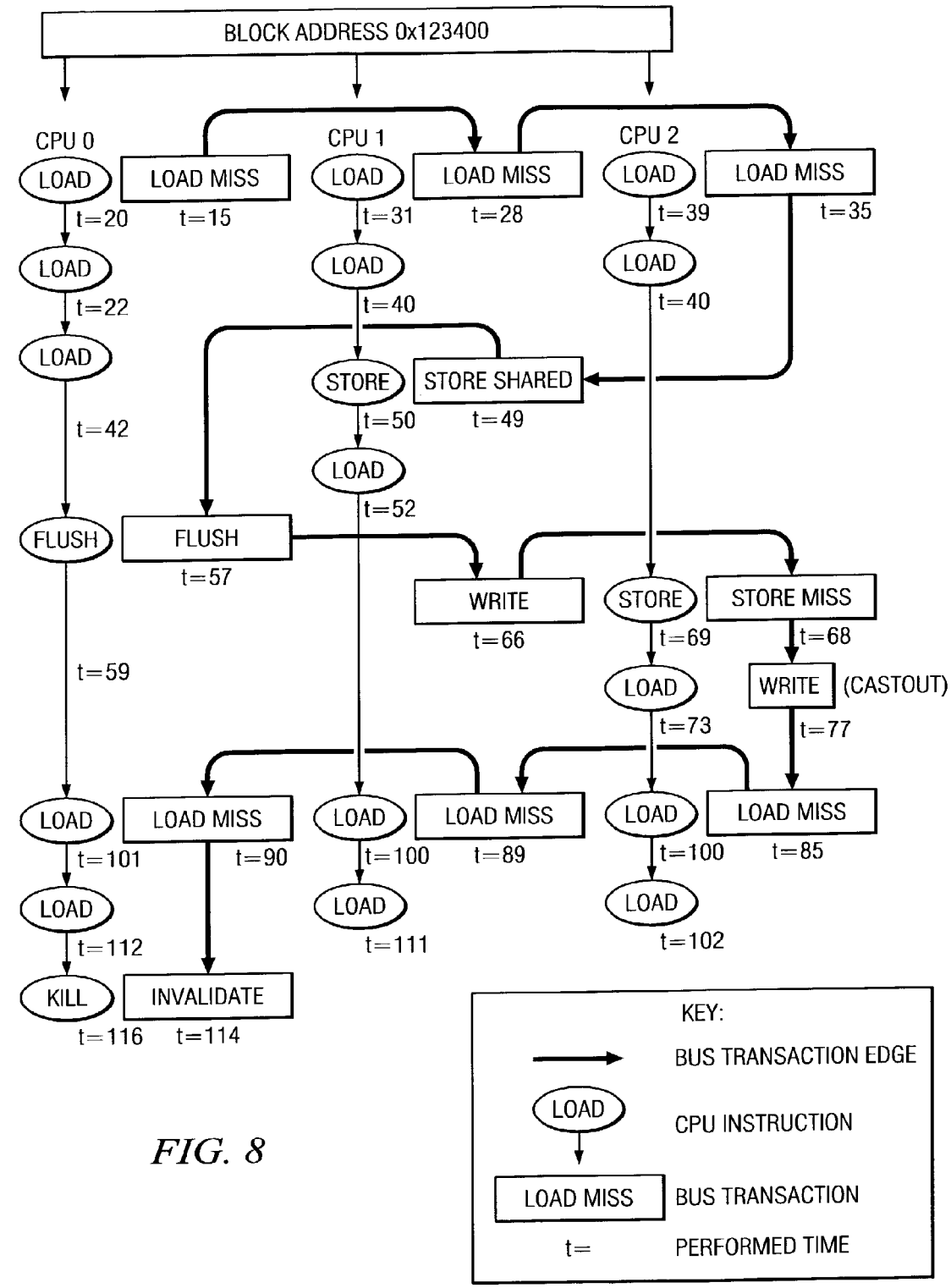
FIG. 8 is a graphical example of a block address plot.

A graphical example of a block address plot is illustrated in FIG. 8. The information for generating a block address plot such as that of FIG. 8 may be obtained from the BSA list storage 740. In FIG. 8, ovals represent processor instructions, rectangles represent bus transactions, arrows represent bus transaction edges and the "t" values represent the performed time. As can be seen in FIG. 8, the various processor and bus transactions are ordered based on increasing performed time.

Returning to FIG. 7, the system specific data storage 780 stores system specific data that are used to set up system specific information within the consistency and coherence checking module. For example, the cache block size and flags that indicate whether a particular check should be enabled or disabled may be stored for each system in the system specific data storage 780. This data may then be used by the present invention to control the operation of the consistency and coherence checking module.

The order and consistency checker 760 uses several checking algorithms for checking and ensuring that the multiprocessor model that is under test follows consistency and coherence rules, such as those discussed above, under all conditions. The checks are applied to each event in the event database 720 and can be broken up into two main categories, order checks and coherence checks, which cover most of the consistency and coherence requirements in a multiprocessor system. The checks are independent of each other allowing additional checks and deviations to be added based on varying architectures and implementations of those architectures.

The checking algorithms used in the preferred embodiments of the present invention are based on the write-invalidate protocol defined for maintaining cache-coherence in multiprocessor systems. The protocol assumes that all storage accesses are snooped by all processors in the system. Checking for correct data values is an integral part of the checking algorithms. The cache and memory functional simulators 750 are used to compare expected data values with data values in read/write and load/store operations. In addition, the checking algorithms described herein assume a system in which there is a single system bus. However, the present invention may easily be extended to support multiple bus systems.

Figure 9:
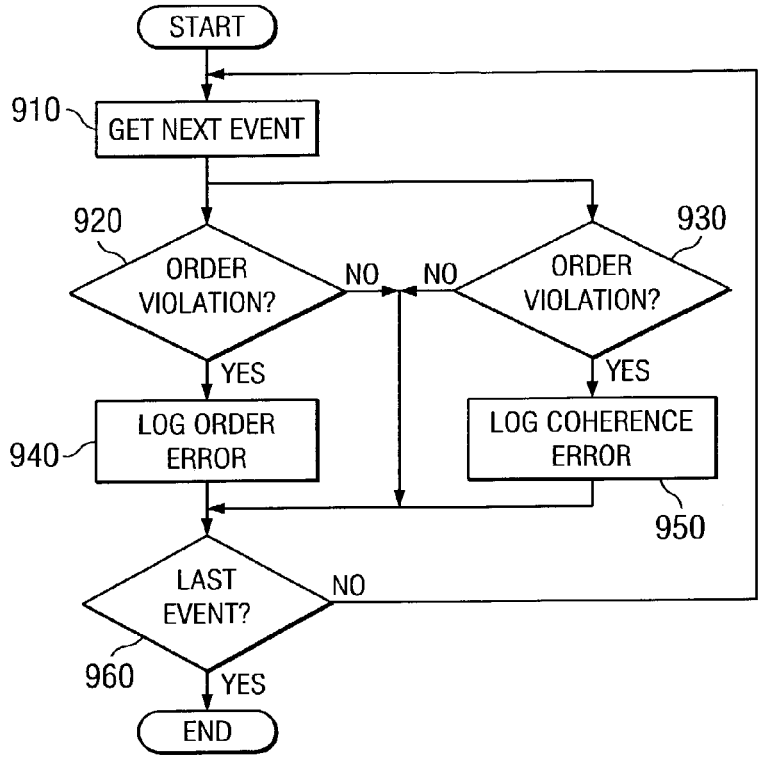
FIG. 9 is a general flowchart outlining the overall checking algorithm used by the order and coherence checker of the present invention.

FIG. 9 is a general flowchart outlining the overall checking algorithm used by the order and coherence checker of the present invention. As shown in FIG. 9, the operation starts by obtaining the next event in the event database (step 910). Thereafter, parallel checks are performed to determine if this event poses an order violation (step 920) and/or a coherence violation (step 930). If there is an order violation, then an order error is logged (step 940). If there is a coherence violation, then a coherence error is logged (step 950). A determination is then made as to whether the event is the last event in the event database (step 960). If not, the operation returns to step 910; otherwise the operation terminates.

Figure 10:
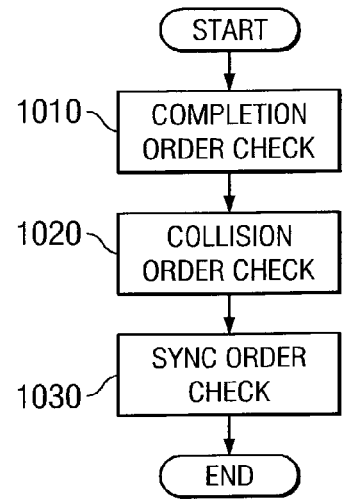
FIG. 10 illustrates a flowchart outlining an exemplary operation for performing consistency checks to determine if an order violation occurs for an event in the event database.

FIG. 10 illustrates a flowchart outlining an exemplary operation for performing consistency checks to determine if an order violation occurs for an event in the event database. As shown in FIG. 10, the present invention performs three primary consistency checks in order to determine if there is an order violation. The first consistency check is the completion order check (step 1010) which is used to ensure that every event in the event database from a particular processor has a completion time that is later than the completion time of the previous instruction. This check ensures that all instructions form a processor are completed in program order.

The second consistency check is the collision order check (step 1020). The collision order check is used to ensure that the rule "all instructions from a processor to overlapping addresses should complete and perform in the order of their issuance" is satisfied. The collision order check is performed by creating an ordered list for each processor, based on issuance time, of processor events from a processor to a particular address. The collision order check traverses the ordered list of processor events and verifies that every instruction accessing a particular address has a completion time and performed time that is later than the completion time and performed time of the previous instruction accessing the same address.

The third consistency check is the sync order check (step 1030). The sync order check is used to ensure that the rule "all instructions in a processor before the SYNC instruction should perform before the SYNC performs and all instructions after the SYNC should perform after the SYNC performs" is satisfied. The sync order check is performed by using the ordered list of processor events for each processor and verifying that every instruction issued before a SYNC has a performed time that is earlier than the performed time of the SYNC instruction and every instruction issued after the SYNC has a performed time that is later than the performed time of the SYNC instruction.

The results of the checks 1010–1030 are output as a pass/fail result for each event. This output may be used to set flags associated with each event in the event database indicating whether the particular event poses a consistency violation. This information may later be used in determining sources of consistency errors and identification of points in the multiprocessor model that may require redesign.

In addition to the consistency checks described above, the present invention performs coherency checks to verify that stores to a given data location are serialized in some order and no processor of the multiprocessor system is able to observe any subset of those stores as occurring in a conflicting order. The coherency checks, according to a preferred embodiment, make use of the cache functional simulator to simulate various levels of cache in the multiprocessor model. Stores to the cache, i.e. store events, are applied to the cache functional simulator in the order that they occur in the trace information from the canonical tracers. However, rather than updating the cache simulator with the actual data stored, the performed time of the store event is applied to the simulator as data.

The cache simulator stores the latest performed time for each byte of each cache line in the simulated cache, in an associated data structure. In this way, the age of the data in the cache at any one time during the trace may be determined from the performed times stored for each byte of the simulated cache. Alternatively, the trace information may be applied to the cache simulator on a byte by byte basis so that the coherency checking is performed for combination of cache byte and processor of a given chip in the model under test.

The magnitude of the performed time may be used as an indication of the global age, or the global serialization order, of the data stored. A comparison of the performed times of store events may be used to verify coherence across all of the processors of the multiprocessor system, as discussed hereafter.

In addition to store events, the trace information includes load events. For each load event that is encountered during traversing of the trace information, a comparison is made between a global expected data age of the data in the cache and the performed time of the data in the cache at the cache location referenced by the load event. The expected data age is the latest data age seen by any previous load event in the trace information. That is, the expected data age is the latest performed time identified in a previous check of a load event.

The comparison of the global expected data age of the data and the performed time associated with the data location referenced by the load instruction involves checking that the performed time is greater than or equal to the global expected data age. Stated differently, the check is to ensure that the performed time, or data age in the simulated cache, is not less than the global expected data age, i.e. the latest previously encountered data age. If the data age in the simulated cache is less than the latest previously encountered data age, then a cache coherence violation has occurred.

Figure 11:
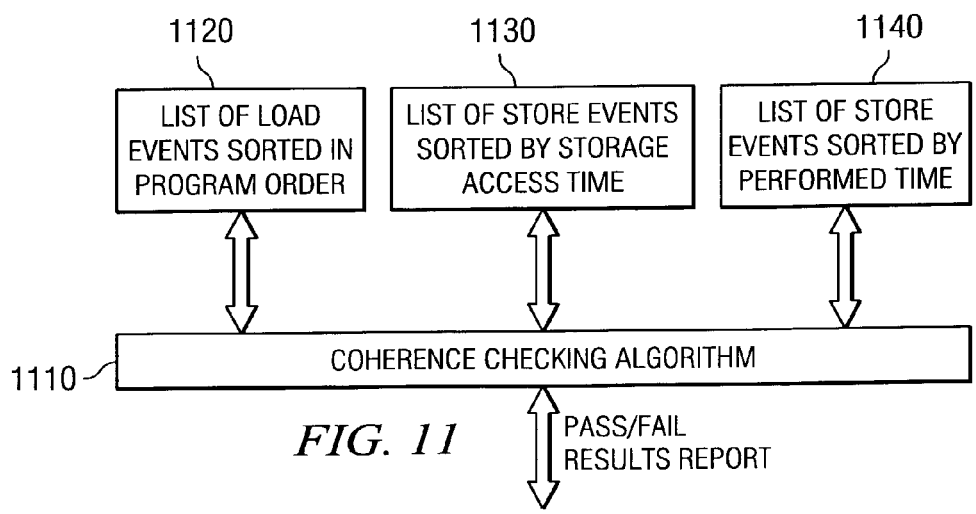
FIG. 11 provides an exemplary block diagram illustrating the operation of the cache coherence checking mechanism of the present invention.

FIG. 11 provides an exemplary block diagram illustrating the operation of the cache coherence checking mechanism of the present invention. As shown in FIG. 11, the cache coherence checking mechanism 1110 according to a preferred embodiment makes use of a plurality of different lists 1120–1140 of the events in the event database. These lists 1120–1140 may be generated, for example, by the event database interface, as discussed previously.

A first list 1120 includes a list of loads in program order sorted by issue time for every processor. Two additional lists 1130–1140 used by the coherence checking algorithm include a list of stores sorted in order of storage access time and a list of stores sorted in order of performed time for all processors.

The coherence checking algorithm uses the lists of stores 1130–1140 to determine a maximum age of data currently seen by each processor in the multiprocessor system. The list of loads 1120 is used in conjunction with the maximum age of data currently seen by the processors to determine if a coherence violation has occurred. More specifically, the list of loads 1120 is generated and sorted in program order. For each load in the load list, the age of loaded data is determined using the functional cache simulator. A determination is then made as to whether the maximum age of the data that was previously observed by the processors is less than the age of the present data for the current load. If the age of the present data is less than the maximum age previously seen by the processors, then a coherence violation has occurred.

In order to determine the maximum age of the data that may be seen by the processors the events in the two store lists 1130–1140 are used with the functional cache simulator to determine for each processor and each event whether the storage access time of the current event in the store list sorted by storage access time 1130 is less than the current event in the store list sorted by performed time 1140. If the storage access time is less than the performed time, then the current level of the cache is set to the storage access level of the current store event in the list sorted by storage access time 1130. If the storage access time is not less than the performed time, then the current cache level is set to the lowest shared level of cache in the shared cache system.

The expected age of the data is then set to the age of the data for the current cache level. A comparison of the expected age to the maximum data age is made and if the expected age is less than the data age, then a coherence violation has occurred. If the expected age is greater than the data age, then the data age is set to be equal to the expected age.

An example of code that may be used to accomplish the coherence verification described above is provided in FIG. 12. FIG. 13 is a flowchart outlining an exemplary operation of the present invention for determining if a coherence violation has occurred. The flowchart of FIG. 13 corresponds to the algorithm discussed above and the code provided in FIG. 12.

As shown in FIG. 13, the operation starts by getting the next chip in the multiprocessor model (step 1310). Then the next byte of cache memory is identified (step 1315). The next processor on the chip is then identified (step 1320). The next load from the list of loads in program order that is associated with the current byte, chip and processor is identified (step 1325). The cache simulations are updated using the list of stores sorted by performed time and storage access time (step 1330). The data age is then obtained from the cache simulation (step 1335).

A determination is made as to whether the data age is less than a previously obtained data age from the cache simulation (step 1340). If so, then a coherence violation is reported (step 1345). If not, the previous data age is set equal to the current data age (step 1350). Thereafter, or after the coherence violation is reported in step 1345, a determination is made as to whether this is the last load in the trace information for the current processor (step 1355). If not, the operation returns to step 1325. If this is the last load in the trace for that processor, a determination is made as to whether this is the last processor on the chip for which coherence checking is to be performed (step 1360).

If this is not the last processor on the chip, then the operation returns to step 1320. Otherwise, a determination is made as to whether this is the last byte of the cache memory for which coherence is to be checked (step 1365). If this is not the last byte, the operation returns to step 1315. Otherwise, a determination is made as to whether this is the last chip in the model under test (step 1370). If not, the operation returns to step 1310. Otherwise, the operation terminates.

Thus, the present invention provides a mechanism for performing cache coherence verification in a system verification environment. The mechanism of the present invention makes use of the performed time and the storage access time to determine a maximum age of data that may currently be seen by processors of the system. The present invention then determines if the age of the data of the current event is less than the maximum age of data that may be seen by the processors of the system. If so, then a coherence violation has occurred since some processors may see a different order of store operations from other processors of the system.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of performing coherence checking of trace information for a model under test, comprising:
   receiving trace information for a simulated processor of the model under test, wherein the trace information includes at least one load event;
   for each load event of the at least one load event in the trace information, comparing a performed time associated with a simulated byte of cache memory referenced by the load event to an expected data age; and
   determining whether a coherence violation has occurred based on results of the comparison.

2. The method of claim 1, further comprising:
   generating a coherence violation report in response to a determination that the performed time is less than the expected data age.

3. The method of claim 1, wherein the trace information includes at least one store event, and wherein the method further comprises:
   applying at least one store event to a cache functional simulator in an order according to an ordering in the trace information; and
   storing performed times of store events in the at least one store event for a simulated byte of cache memory referenced by the at least one store event.

4. The method of claim 1, further comprising:
   setting a value of the expected data age to a value of the performed time if the performed time is determined to be greater than or equal to the expected data age.

5. The method of claim 1, wherein every load event of the at least one load event is associated with a same simulated byte of cache memory.

6. The method of claim 1, wherein the trace information is for a particular simulated processor of a plurality of simulated processors and a particular simulated byte of cache memory.

7. The method of claim 1, wherein the simulated processor is one of a plurality of simulated processors associated with a simulated chip in the model under test, and wherein the steps of receiving, comparing and determining are performed for each simulated processor of the simulated chip.

8. The method of claim 5, wherein the simulated chip is one of a plurality of simulated chips in the model under test and wherein the steps of receiving, comparing and determining are performed for each simulated processor of each simulated chip in the plurality of simulated chips.

9. A computer program product in a computer readable medium for performing coherence checking of trace information for a model under test, comprising:
   first instructions for receiving trace information for a simulated processor of the model under test, wherein the trace information includes at least one load event;
   second instructions for comparing, for each load event of the at least one load event in the trace information, a performed time associated with a simulated byte of cache memory referenced by the load event to an expected data age; and
   third instructions for determining whether a coherence violation has occurred based on results of the comparison.

10. The computer program product of claim 9, further comprising:
    fourth instructions for generating a coherence violation report in response to a determination that the performed time is less than the expected data age.

11. The computer program product of claim 9, wherein the trace information includes at least one store event, and wherein the computer program product further comprises:
    fourth instructions for applying at least one store event to a cache functional simulator in an order according to an ordering in the trace information; and
    fifth instructions for storing performed times of store events in the at least one store event for a simulated byte of cache memory referenced by the at least one store event.

12. The computer program product of claim 9, further comprising:
    fourth instructions for setting a value of the expected data age to a value of the performed time if the performed time is determined to be greater than or equal to the expected data age.

13. The computer program product of claim 9, wherein every load event of the at least one load event is associated with a same simulated byte of cache memory.

14. The computer program product of claim 9, wherein the trace information is for a particular simulated processor of a plurality of simulated processors and a particular simulated byte of cache memory.

15. The computer program product of claim 9, wherein the simulated processor is one of a plurality of simulated processors associated with a simulated chip in the model under test, and wherein the first, second and third instructions are executed for each simulated processor of the simulated chip.

16. The computer program product of claim 13, wherein the simulated chip is one of a plurality of simulated chips in the model under test and wherein the first, second and third instructions are executed for each simulated processor of each simulated chip in the plurality of simulated chips.

17. An apparatus for performing coherence checking of trace information for a model under test, comprising:
   means for receiving trace information for a simulated processor of the model under test, wherein the trace information includes at least one load event;
   means for comparing, for each load event of the at least one load event in the trace information, a performed time associated with a simulated byte of cache memory referenced by the load event to an expected data age; and
   means for determining whether a coherence violation has occurred based on results of the comparison.

18. The apparatus of claim 17, further comprising:
   means for generating a coherence violation report in response to a determination that the performed time is less than the expected data age.

19. The apparatus of claim 17, wherein the trace information includes at least one store event, and wherein the apparatus further comprises:
   means for applying at least one store event to a cache functional simulator in an order according to an ordering in the trace information; and
   means for storing performed times of store events in the at least one store event for a simulated byte of cache memory referenced by the at least one store event.

20. The apparatus of claim 17, further comprising:
   means for setting a value of the expected data age to a value of the performed time if the performed time is determined to be greater than or equal to the expected data age.

* * * * *